Figure 1:
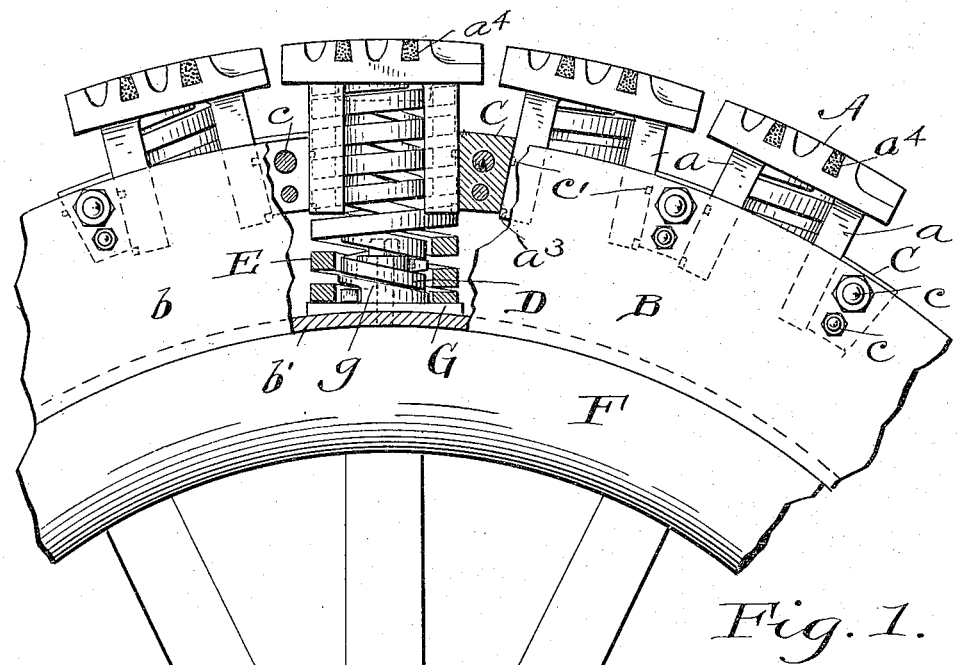

J. P. MURREY.
RESILIENT TREAD FOR VEHICLE WHEELS.
APPLICATION FILED FEB. 19, 1914.

1,156,620.

Patented Oct. 12, 1915.
2 SHEETS—SHEET 1.

Witnesses
Inventor
Jasper P. Murrey
by Thurston & Kwis
attorneys

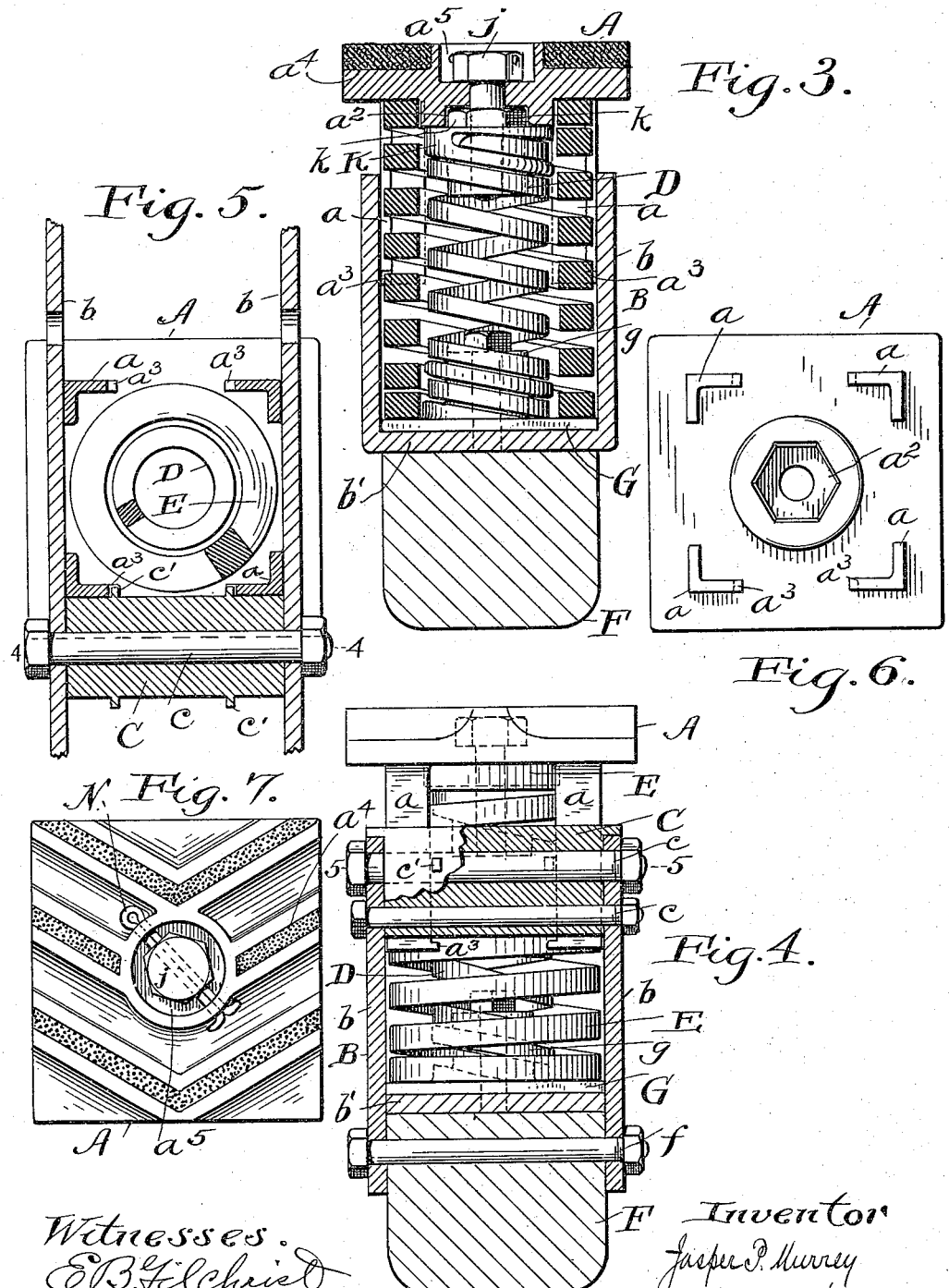

UNITED STATES PATENT OFFICE.

JASPER P. MURREY, OF CLEVELAND, OHIO.

RESILIENT TREAD FOR VEHICLE-WHEELS.

1,156,620.   Specification of Letters Patent.   Patented Oct. 12, 1915.

Application filed February 19, 1914. Serial No. 819,647.

*To all whom it may concern:*

Be it known that I, JASPER P. MURREY, a citizen of the United States, residing at Cleveland, in the county of Cuyahoga and State of Ohio, have invented a certain new and useful Improvement in Resilient Treads for Vehicle-Wheels, of which the following is a full, clear, and exact description.

This invention is an improvement on the resilient tread for vehicle wheels which forms the subject matter of my prior Patent No. 927,578. The essential characteristic of said prior construction is the employment of a plurality of independently movable tread plates, each of which is under the influence of two balanced springs which, when the tread plate is in its normal position, will act in opposite directions thereon, so that one will resist and the other assist the initial inward movement of said tread plate, said springs being arranged so that as the tread plate moves inward the assisting spring will gradually lose its assisting power, and eventually become a resisting spring.

The objects of the present invention are to provide a resilient tread for vehicle wheels which will retain the above mentioned characteristics of construction and mode of operation, but which shall be more durable and more efficient, shall be in a form which can be manufactured economically, and will have certain additional practical advantages which will be hereinafter pointed out.

The invention consists in the construction and combination of parts shown in the drawing, and hereinafter described and definitely pointed out in the appended claims.

Figure 2:
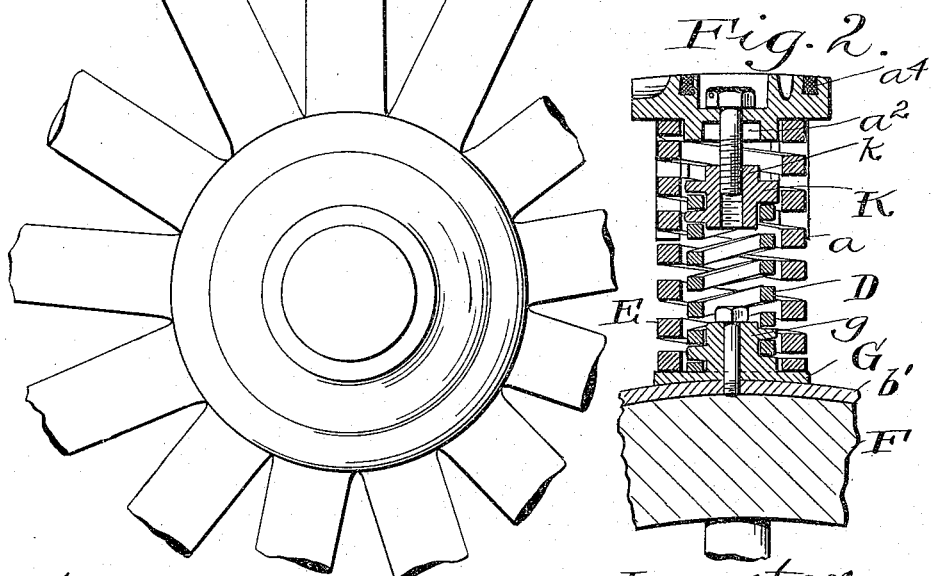

In the drawing, Figure 1 is a side elevation partly sectioned of a portion of a wheel provided with a resilient tread in which the present invention is embodied. Fig. 2 is a sectional view through one of the tread plates and the associated mechanism showing the position the parts will occupy before the springs have been put under tension, as hereinafter set forth. Fig. 3 is a radial section through one tread plate and associated mechanism. Fig. 4 is a radial section in the plane indicated by line 4—4 on Fig. 5 of the tread plate and associated mechanism. Fig. 5 is a sectional view in the plane of line 5—5 on Fig. 4; and Fig. 6 is a view of the inner face of one of the tread plates. Fig. 7 is a top view of one tread plate.

The tread of the wheel is formed by a large number of tread plates A which are mounted in the wheel rim B. This rim includes essentially two side flanges $b$, $b$, and a cylindrical base member $b^1$ which may be made integral with the flanges, as shown in Fig. 3, or independently of them, as shown in Fig. 4. In the latter construction the annular side flanges $b$, $b$, are secured to the felly of the wheel F by bolts $f$.

Each of the tread plates A has projecting inward from its inner face four parallel guide legs $a$, which pass between the flanges $b$, $b$, and are in substantial contact therewith. Distance pieces C extend between the flanges $b$, $b$, and are secured there by bolts $c$, and thereby the flanges are held in the required relation to one another. One of these distance pieces is placed between each pair of adjacent tread plate mechanisms, and they are placed so that the legs $a$ will engage two of these distance pieces and be guided thereby, so that when force is applied to a tread plate to move it inward, it will move in a substantially radial direction toward the axis of the wheel. Associated with each tread plate is a spring seat G which is fixed to the rim member $b^1$ and has integral with it an outwardly extended boss $g$ which is externally threaded. A spring E rests at one end upon the seat G out of contact with the boss $g$. The outer end of this spring passes into the space bounded by the four legs $a$ and engages with the inner face of the associated tread plate.

A second spring D which is normally shorter than spring E screws onto the boss $g$, and is thereby anchored to the rim. A block K is fixed to the outer end of the spring D. Preferably it is externally threaded; and the spirally wound spring D screws onto it. This block K has upon its outer face an angularly shaped boss $k$ which is intended to fit into the correspondingly shaped recess $a^2$ in the inner face of the tread plate.

Now, when the described parts have been placed in the described relation to each other, neither spring is under tension; and the parts will be in substantially the condition shown in Fig. 2. A bolt J which goes radially through a hole in the tread plate is screwed down into the block K, the head $j$ of said bolt lying in a recess or depression $a^5$ in the outer face of the tread plate. As this bolt is screwed in, the block K and the tread plate A will obviously be drawn toward each other, the latter moving inward and the former moving outward. As the tread plate moves inward it will by reason of its engagement with the outer end of the spring E compress the same and put it under tension. As the block K is moved outward, it will obviously lengthen the spring D, thereby putting it under tension. When the bolt J has been screwed in far enough the angular boss $k$ will have entered the recess $a^2$ in the inner face of the tread plate, and thereby any turning movement of block K, such as would disconnect it from spring D, will be prevented.

The two springs will automatically come to balance one another,—and the position of the tread plate will depend on the relative resistance of the springs to being tensioned. The spring D exerts its force in the direction to draw the tread plate inward. The spring E, however, resists this inward movement. This makes the tread plate very sensitive to the initial movement inward from its normal position. When, therefore, a wheel provided with a tread composed of tread plates A, each associated with the described mechanism, is turned, each tread plate as it comes into contact with the ground and begins to support the weight will begin an inward movement very readily. As it moves inward, however, the spring D will shorten itself and will act with decreasing force in the direction to draw said tread plate inward, and will so act until by the inward movement of the tread plate the spring D has come to have its normal length. If the tread plate is moved in any farther, this spring D will with increasing force, resist this inward movement. Each of these tread plates furnishes therefore a very resilient support for the vehicle and begins to move from its normal position inward so easily that small inequalities in the road surface will hardly be felt in the vehicle. The increasing resistance of the two springs very soon, however, brings the tread plate to a standstill with respect to its inward movement.

It is conceivable, of course, that the spring D may break, and if it did, the associated tread plate would drop off of the wheel. To prevent this, one side of each of the legs $a$ is provided near its inner end with an inwardly directed shoulder $a^3$; and each of the distance pieces C is provided with fingers $c^1$, which extends to a position outside of but in the path of these shoulders $a^3$, so that if the tread plate were disconnected from the rim and started to come out, these shoulders $a^3$, by engaging the fingers $c^1$, would prevent it from coming out.

These tread plates which, as stated, form the tread of the wheel which contacts with the road should lie pretty close together. In fact, they should lie as close as they can without interfering with one another's action. There may be as many of them as are required; they may be of any desired size; and it is not at all essential to the invention that there shall be but one circumferential row of them, as shown in the drawing.

In the outer face of each tread plate numerous dove tailed grooves $a^4$ will be formed; and they may be filled with asbestos, or rubber or any other suitable filling,—which will act to very greatly decrease the noise which would otherwise result from the contacting of the plates with the pavement. Likewise these grooves and filling increase the traction power of the tread plates.

To prevent the bolt J from being accidentally unscrewed a cotter pin N is driven through holes in the wall surrounding the recess $a^5$ and through a hole in the head of the bolt J.

Having described my invention, I claim:

1. The combination of a wheel rim having side flanges, a spring seat fixed to said rim and having an externally threaded boss extending radially outward therefrom, a coil spring which is screwed upon said threaded boss, an externally threaded block which is screwed into the outer end of said spring, a tread plate having guide members which pass between and engage said rim flanges, a coil-spring which surrounds the coil spring first mentioned and engages said tread plate and said spring seat, a bolt passing through said tread plate and screwing into said externally threaded block, thereby expanding the first mentioned spring and compressing the other spring.

2. The combination of a wheel rim having side flanges, a spring seat fixed to said rim and having an externally threaded boss extending radially outward therefrom, a coil spring screwed upon said threaded boss, an externally threaded block screwed into the outer end of said spring and has an external angular boss, a tread plate having guide members which pass between and engage said rim flanges,—which tread plate has on its under face, an angular recess which receives the angular boss referred to, a compressed coil spring which engages at its inner end with said spring seat and at its outer end with said tread plate, a bolt passing through said tread plate and screwing into said externally threaded block thereby holding the angular boss in said angular recess.

3. The combination with a wheel rim, having two side flanges, spaced distance blocks which lie between and are secured to said side flanges, and a plurality of tread plates which lie outside of the rim flanges,— each of said tread plates having four legs which go between and have a guiding engagement with the adjacent side flanges and the two adjacent distance blocks,—said legs having laterally projecting shoulders, pins fixed to said distance blocks and lying outside and in the path of said shoulders, a spring lying between the tread plate and the rim and inside of the space bounded by the four legs of said tread plate, and acting to yieldingly press said tread plate outward.

In testimony whereof, I hereunto affix my signature in the presence of two witnesses.

JASPER P. MURREY.

Witnesses:
E. L. THURSTON,
L. I. PORTER.